United States Patent
Bostick et al.

(10) Patent No.: US 9,858,323 B2
(45) Date of Patent: *Jan. 2, 2018

(54) INTERMEDIATE DATA FORMAT FOR DATABASE POPULATION

(71) Applicant: International Business Machines Corporation, Armonk, NY (US)

(72) Inventors: James E. Bostick, Cedar Park, TX (US); John M. Ganci, Jr., Cary, NC (US); John P. Kaemmerer, Pflugerville, TX (US); Craig M. Trim, Sylmar, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/220,888

(22) Filed: Jul. 27, 2016

(65) Prior Publication Data

US 2016/0335335 A1  Nov. 17, 2016

Related U.S. Application Data

(63) Continuation of application No. 13/282,083, filed on Oct. 26, 2011, now Pat. No. 9,471,653.

(51) Int. Cl.
| | |
|---|---|
| *G06F 7/00* | (2006.01) |
| *G06F 17/00* | (2006.01) |
| *G06F 17/30* | (2006.01) |
| *G06F 11/30* | (2006.01) |

(52) U.S. Cl.
CPC .... *G06F 17/30563* (2013.01); *G06F 11/3065* (2013.01); *G06F 17/30569* (2013.01)

(58) Field of Classification Search
CPC .................................................. G06F 17/30569
USPC .......................................................... 707/602
See application file for complete search history.

(56) References Cited

U.S. PATENT DOCUMENTS

| | | | |
|---|---|---|---|
| 2003/0145022 A1 | 7/2003 | Dingley | |
| 2004/0001218 A1* | 1/2004 | Christiansen | G06F 3/1204 358/1.15 |
| 2004/0031015 A1* | 2/2004 | Ben-Romdhane | G06F 8/75 717/107 |

(Continued)

OTHER PUBLICATIONS

Hebeler, J., et al., "Semantic Web Programming", copyright 2009 by Wiley Publishing, Inc., Indianapolis, Indiana, 651 pages.

(Continued)

*Primary Examiner* — Van Oberly
(74) *Attorney, Agent, or Firm* — John R. Pivnichny; Madeline F. Schiesser; Keohane & D'Alessandro PLLC

(57) ABSTRACT

An approach is provided that receives input from multiple data sources and transforms it into a common, intermediate format, where only one generic parser is required for the purpose of transformation into RDF, and the subsequent input to a triplestore database. A triplestore management tool provides this capability. The triplestore management tool includes a formatting component configured to receive data sources from a plurality of data source parsers, and transform each of the data sources into a single format. A parsing component parses each transformed data source at a common parser, and loads each of the transformed data sources from the common parser to a triplestore database.

15 Claims, 3 Drawing Sheets

(56) References Cited

U.S. PATENT DOCUMENTS

| | | | |
|---|---|---|---|
| 2005/0097082 A1* | 5/2005 | Yan | G06F 9/45516 |
| 2006/0168515 A1* | 7/2006 | Dorsett, Jr. | G06F 17/2247 715/255 |
| 2006/0277170 A1* | 12/2006 | Watry | G06F 17/30932 |
| 2010/0191699 A1* | 7/2010 | Gould | G06N 5/02 706/59 |
| 2010/0318558 A1* | 12/2010 | Boothroyd | G06F 17/30731 707/769 |
| 2013/0110852 A1 | 5/2013 | Bostick et al. | |
| 2013/0318558 A1 | 11/2013 | Sieber | |

OTHER PUBLICATIONS

Proceedings of the 1st Workshop on Semantic Personalized Information Management, May 18, 2010, 48 pages.

Wenneker, B., "BibMix: Enrichment of Citation Metadata Based on Integration of Bibliographic Data", Master's thesis, Sep. 2, 2010, 63 pages.

Pazienza et al., "A Desktop-Integrated Semantic Platform for Personal Information Management", ART Research Grou, Dept. of Computer Science, 2011, 7 pages.

Oberly, Van Hong, U.S. Appl. No. 13/282,083, Office Action dated Apr. 9, 2013, 25 pages.

Oberly, Van Hong, U.S. Appl. No. 13/282,083, Final Office Action dated Sep. 12, 2013, 20 pages.

Oberly, Van Hong, U.S. Appl. No. 13/282,083, Office Action dated May 30, 2014, 20 pages.

Oberly, Van Hong, U.S. Appl. No. 13/282,083, Final Office Action dated Oct. 2, 2014, 20 pages.

Oberly, Van Hong, U.S. Appl. No. 13/282,083, Office Action dated Mar. 4, 2015, 17 pages.

Oberly, Van Hong, U.S. Appl. No. 13/282,083, Final Office Action dated Aug. 24, 2015, 20 pages.

Oberly, Van Hong, U.S. Appl. No. 13/282,083, Notice of Allowance dated Jul. 8, 2016, 9 pages.

* cited by examiner

INTERMEDIATE DATA FORMAT FOR DATABASE POPULATION

The present patent document is a continuation of U.S. patent application Ser. No. 13/282,083, filed Oct. 26, 2011, entitled "INTERMEDIATE DATA FORMAT FOR DATABASE POPULATION", the disclosure of which is incorporated herein by reference.

FIELD OF THE INVENTION

The present invention relates to database techniques and more specifically to Resource Description Framework (RDF) database triple-store population and access.

BACKGROUND OF THE INVENTION

Resource Description Framework (RDF) is a collection of specifications originally designed as a meta-data model. The RDF meta-data model is based on an idea of making statements about resources in the form of subject-predicate-object expressions (e.g., triplets, triples, or RDF triplets). Typically, a subject denotes a resource, and a predicate denotes traits or aspects of the resource and expresses a relationship between the subject and an object.

A triplestore is a purpose-built database for the storage and retrieval of RDF meta-data. A triple store may be populated with data from a variety of structured and unstructured data sources. These may include, for instance, PDF documents, word processing documents, relational database data, XML feeds, and so on. In conventional techniques, a parser is often manually created for each data source to read the data and populate the database.

The application programming interface (API) for adding data to a triplestore varies from vendor to vendor. In a complex project where multiple, disparate data sources exist, each data source parser is typically matched to the underlying triplestorage API. However, if the triplestore vendor changes, each parser has to be updated to use the new API. This becomes problematic if many parsers are involved.

SUMMARY OF THE INVENTION

An approach is provided that receives input from multiple data sources and creates a common, intermediate data format that can be parsed by a single parser, regardless of the number or vendor type making use of the data. Specifically, the parser for each data source can be written to transform the source data into a common, intermediate format, where only a single parser is required for the purpose of transformation into RDF, and subsequent input to a triplestore database.

A first aspect of the present invention provides a method for triplestore database population, comprising: receiving a plurality of data sources parsed by a plurality of data source parsers, wherein each of the plurality of data sources corresponds to each of the plurality of data source parsers according to a data type of each of the plurality of data sources; transforming each of the plurality of parsed data sources into a single intermediary format, the intermediary format not being associated with a database into which the data sources are to be stored; identifying a triplestore database into which the data sources are to be stored; selecting a first shared parser based on compatibility with the triplestore database; replacing the triplestore database with a second triplestore database; selecting a second shared parser to receive the intermediary format, the second shared parser being selected for compatibility with the second triplestore database; and replacing the first shared parser with the second shared parser, wherein the second shared parser is configured to parse from the intermediary format to a format of the second triplestore database, and wherein the plurality of data source parsers are not replaced.

A second aspect of the present invention provides a system for triplestore database population comprising: at least one processing unit; memory operably associated with the at least one processing unit; and a triplestore management tool storable in memory and executable by the at least one processing unit, the triplestore management tool comprising: a formatting component configured to: receive a plurality of data sources parsed by a plurality of data source parsers, wherein each of the plurality of data sources corresponds to each of the plurality of data source parsers according to a data type of each of the plurality of data sources; and transform each of the plurality of parsed data sources into a single intermediary format, the intermediary format not associated with a database into which the data sources are to be stored; and a parsing component configured to: identify a triplestore database into which the data sources are to be stored; select a first shared parser based on compatibility with the triplestore database; replace the triplestore database with a second triplestore database; select a second shared parser to receive the intermediary format, the second shared parser being selected for compatibility with the second triplestore database; and replace the first shared parser with the second shared parser, wherein the second shared parser is configured to parse from the intermediary format to a format of the second triplestore database, and wherein the plurality of data source parsers are not replaced.

A third aspect of the present invention provides a computer usable tangible storage device storing computer instructions, which when executed, enables a computer system for triplestore database population, the computer instructions comprising: receiving a plurality of data sources parsed by a plurality of data source parsers, wherein each of the plurality of data sources corresponds to each of the plurality of data source parsers according to a data type of each of the plurality of data sources; transforming each of the plurality of parsed data sources into a single intermediary format, the intermediary format not associated with a database into which the data sources are to be stored; identifying a triplestore database into which the data sources are to be stored; selecting a first shared parser based on compatibility with the triplestore database; replacing the triplestore database with a second triplestore database; selecting a second shared parser to receive the intermediary format, the second shared parser being selected for compatibility with the second triplestore database; and replacing the first shared parser with the second shared parser, wherein the second shared parser is configured to parse from the intermediary format to a format of the second triplestore database, and wherein the plurality of data source parsers are not replaced.

Figure 1:
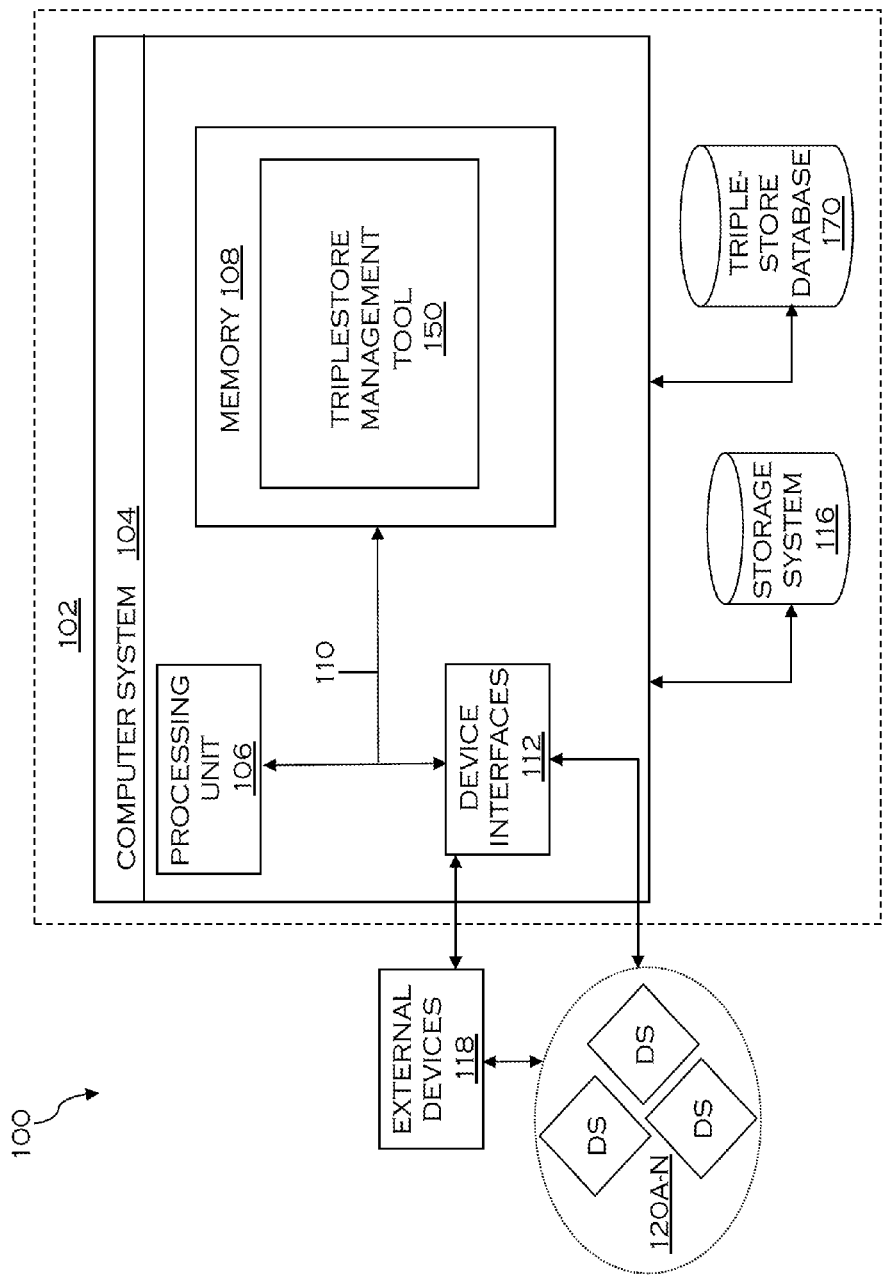
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The invention will now be described more fully herein with reference to the accompanying drawings, in which exemplary embodiments are shown. An approach is provided that receives input from multiple data sources and creates a common, intermediate data format, regardless of the number or vendor type making use of the data. The parser for each data source can be written to transform the source data into a common, intermediate data format, where only a single parser is required for the purpose of transformation into RDF, and the subsequent input to a triplestore database. Specifically, a triplestore management tool provides this capability. The triplestore management tool includes a formatting component configured to receive a set (i.e., one or more) of data sources from each of a plurality of data source parsers, and communicate with each of the plurality of data source parsers to transform each of the set of data sources into a single format. The triplestore management tool further comprises a parsing component configured to parse each of the set of transformed data sources at a common parser, and load each of the set of transformed data sources from the common parser to a triplestore database.

This disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "calculating," "evaluating," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

Referring now to FIG. 1, a computerized implementation 100 of the present invention will be described in greater detail. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for data source transformation and triplestore database population. It should be understood that any other computers implemented under the present invention may have different components/software, but will perform similar functions. As shown, computer system 104 includes a processing unit 106 capable of receiving input from a plurality of data sources (DS) 120A-N and delivering them to memory 108. Also, shown is memory 108 for storing a triplestore management tool 150, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing outputs from external devices 118 (e.g., a graphical user interface operated by an end-user) to triplestore management tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating triplestore management tool 150, which is stored in memory 108 and/or storage system 116. While executing computer program code, processing unit 106 can read and/or write data to/from memory 108, storage system 116, and triplestore database 170. Storage system 116 and triplestore database 170 can include VCRs, DVRs, RAID arrays, USB hard drives, optical disk recorders, flash storage devices, and/or any other data processing and storage elements for storing and/or processing data. Although not shown, computer system 104 could also include I/O interfaces that communicate with one or more external devices 118 that enable a user to interact with computer system 104 (e.g., a keyboard, a pointing device, a display, etc.).

Figure 2:
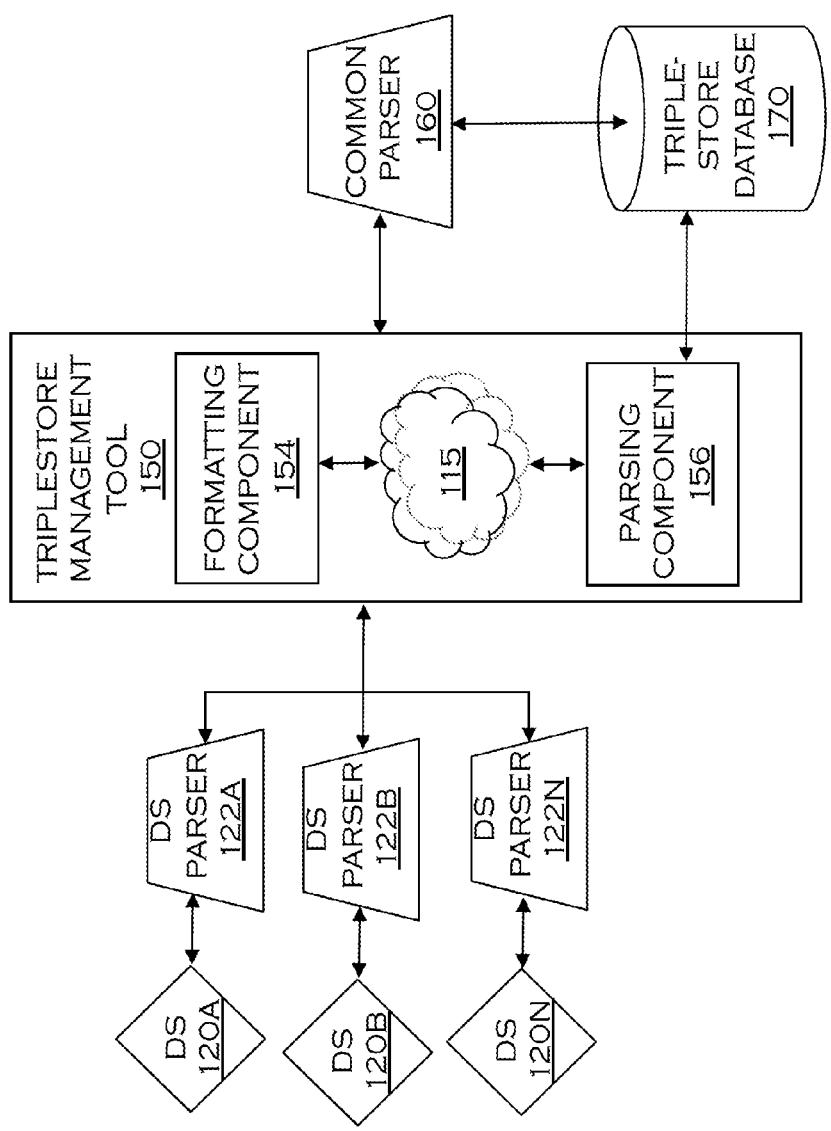
FIG. 2 shows a triplestore management tool that operates in the environment shown in FIG. 1.

Referring now to FIG. 2, triplestore management tool 150, which parses, transforms, and loads data into a triplestore database, will be described in greater detail. As shown, triplestore management tool 150 is in communication with a set of data source (DS) parsers 122A-N, each of which corresponds to a data source 120A-N. Data sources 120A-N may comprise any number of unique data source types, e.g., binary files (Microsoft® Office, PDF, XML, images, audio, video, etc.) relational database data, HTML web pages (including hosted microformats), web services, etc., each of which are formatted differently. The sources may differ in their location, quality of the provided data, and the protocol, i.e., the way data can be collected/queried and the format of the data. Triplestore management tool 150 is capable of dealing with varying characteristics of data sources and their data.

As shown in FIG. 2, triplestore management tool 150 comprises a formatting component 154, which receives each uniquely formatted data source 120A-N from each of plurality of DS parsers 122A-N, and communicates with DS parsers 122A-N to transform each data source 120A-N into a single, common format. In one embodiment, formatting component 154 is configured to transform each data source 120A-N into a single, intermediate meta-data format 115 common to each data source 120A-N. That is, formatting component 154 operates with DS parsers 122A-N to extract and logically structure each parsed data source 120A-N. A variety of meta-data extraction techniques may provide this functionality, no one technique being dispositive. For example, meta-data extraction can be performed via template-based extraction, rule-based extraction, machine-learning-based extraction, and so on. The specific approach may be selected based on the source data. For example, if the source data is already highly structured (e.g., relational data), a template-based approach is typically sufficient. If the source data is unstructured (e.g., not structured for database management systems), machine learning might be more appropriate. If the source data lies somewhere in between (e.g. semi-structured), then a rule-based approach might be more beneficial. However, because the source data can be virtually anything (e.g., anything that is ASCII text), the specific approach to best extract the desired data is determined on the fly and on a case-by-case basis.

Next, the extracted meta-data is configured as a style-independent, text-based file format corresponding to data sources 120A-N. Formatting component 154 processes the extracted meta-data from data sources 120A-N into a common, formatted structure. For example, the common format may comprise the following, which is formatted in a Subject, Predicate, Object format:

```
<?xml version="1.0" encoding="UTF-8"?>

<resource concept="DomainTerm" text="application assembly tool">
            <property text="hasAcronym">
                <resource concept="DomainTerm" text="AAT"/>
            </property>
        </resource>
        <resource concept="DomainTerm" text="address box">
            <property text="hasAcronym">
                <resource concept="DomainTerm" text="AB"/>
            </property>
        </resource>
        <resource concept="DomainTerm" text="aggregate backup and recovery support">
            <property text="hasAcronym">
                <resource concept="DomainTerm" text="ABARS"/>
            </property>
        </resource>
        <resource concept="DomainTerm" text="automated build and test">
            <property text="hasAcronym">
                <resource concept="DomainTerm" text="ABAT"/>
            </property>
        </resource>
        ....

```

As shown, the common format has inherent triples:

```
resource element       (subject)
    property child element    (predicate)
        resource child element   (object)
```

Loading this single, commonly formatted data into triplestore database 170 now requires only a single parser (i.e., common parser 160), which is generic. Triplestore management tool 150 comprises a parsing component 156 configured to parse the transformed data 115 from each of the set of data sources 120A-N at common parser 160, and load the transformed data 115 into triplestore database 170. In one embodiment, parsing component 156 is configured to parse data sources 120A-N into RDF data at common parser 160. So, for example, when the following portion of the common format:

```
<resource concept="DomainTerm" text="application assembly tool">
    <property text="hasAcronym">
        <resource concept="DomainTerm" text="AAT"/>
    </property>
</resource>,
``` is loaded into the triple store, the following triples are constructed:

```
application assembly tool rdf:type DomainTerm
application assembly tool hasAcronym AAT
AAT rdf:type DomainTerm.
```

Now that the triplestore has been populated by common parser 160 based on the intermediate data format, a change to the triplestore (e.g., a new triplestore vendor is introduced) requires only a change to common parser 160. The transformation process from data source to commonly formatted intermediate data format is not altered if the triplestore format changes. Each DS parser 122A-N for the source data files remains the same, as they are no longer tightly coupled to a pre-specified vendor triplestore following the transformation. Likewise, the common format of the triplestore process will not change if the source(s) change. Parsing component 156 provides this functionality by continuously monitoring/determining a triplestore database type of triplestore database 170, and analyzing a compatibility of common parser 160 with the triplestore database type. If the two are no longer compatible, the triplestore database vendor has likely changed, and common parser 160 needs to be replaced accordingly.

It can be appreciated that the approaches disclosed herein can be used within a computer system for triplestore database population, as shown in FIG. 1. In this case, triplestore management tool 150 can be provided, and one or more systems for performing the processes described in the invention can be obtained and deployed to computer infrastructure 102. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 3:
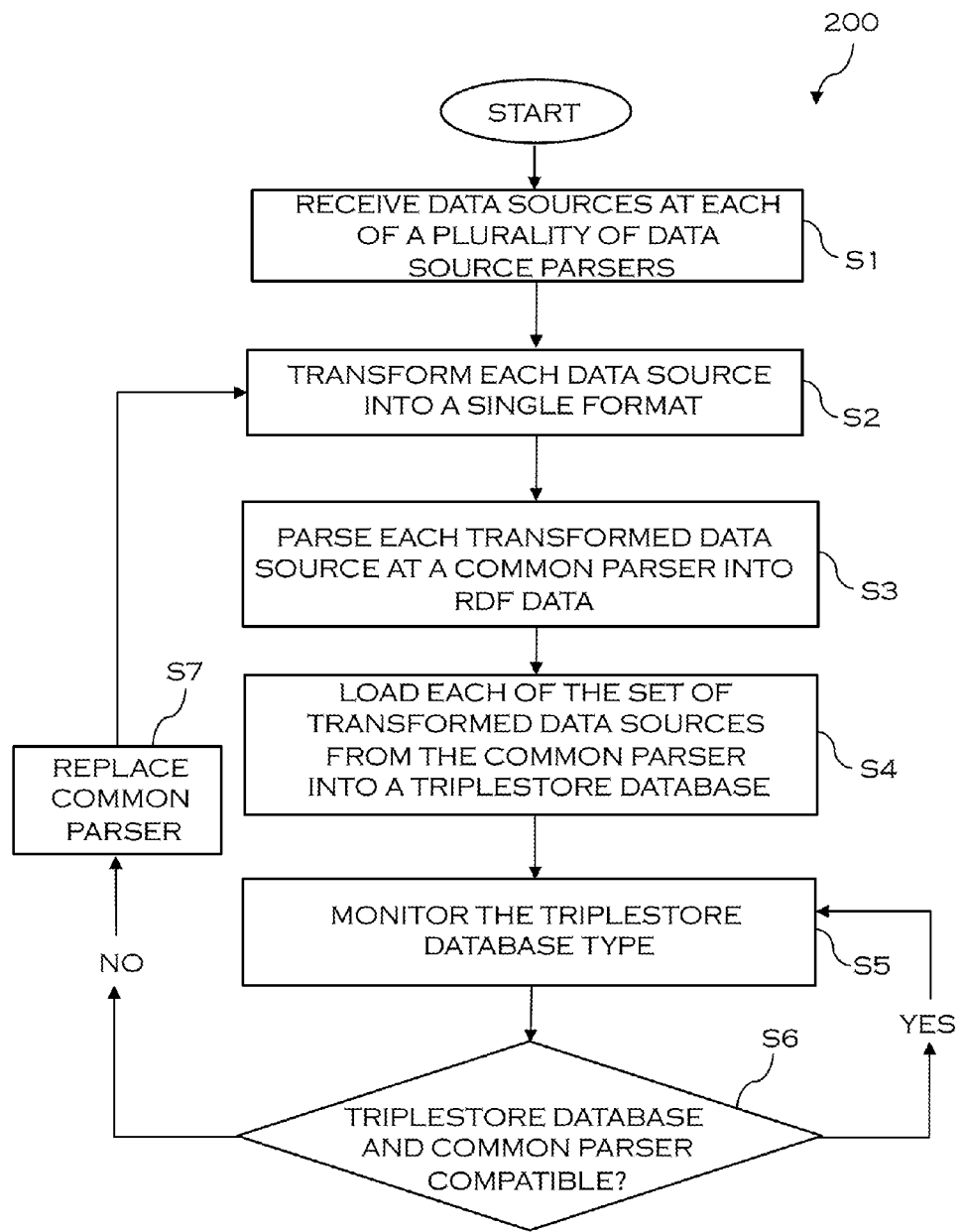
FIG. 3 shows a flow diagram of an approach for triplestore database population according to embodiments of the invention.

The program modules carry out the methodologies disclosed herein, as shown in FIG. 3. Shown is a method 200 for triplestore database population, wherein, at S1, a plurality of data sources are received at each of a plurality of data source parsers. At S2, each data source is transformed into a single format Next, at S3, each transformed data source is transformed at a common parser into RDF data, and loaded into a triplestore database at S4. The triplestore database type is monitored at S5, to determine whether the triplestore database and the common parser are compatible (S6). If yes, the process returns to S5 for continued monitoring. If no, the common parser is replaced at S7 based on the triplestore database type, and the process returns to S2 to transform each data source into a single format compatible with the updated common parser and triplestore database.

The flowchart of FIG. 3 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations.

In one embodiment, for example, the software elements may include program instructions and/or data adapted for execution by a hardware element, such as a processor.

Program instructions may include an organized list of commands comprising words, values, or symbols arranged in a predetermined syntax, that, when executed, may cause a processor to perform a corresponding set of operations.

For example, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer-readable storage device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided an approach for triplestore database population based on a common, intermediate meta-data format and common parser. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for triplestore database population, comprising:
   receiving a plurality of data sources parsed by a plurality of data source parsers, wherein each of the plurality of data sources corresponds to each of the plurality of data source parsers according to a data type of each of the plurality of data sources;
   transforming each of the plurality of parsed data sources into a single intermediary format, the intermediary format not being associated with a database into which the data sources are to be stored;
   identifying a triplestore database into which the data sources are to be stored;
   selecting a first shared parser based on compatibility with the triplestore database;
   replacing the triplestore database with a second triplestore database;
   selecting a second shared parser to receive the intermediary format, the second shared parser being selected for compatibility with the second triplestore database; and
   replacing the first shared parser with the second shared parser, wherein the second shared parser is configured to parse from the intermediary format to a format of the second triplestore database, and wherein the plurality of data source parsers are not replaced.

2. The method according to claim 1, further comprising parsing each of the plurality of transformed data sources into Resource Description Framework (RDF) data at the first shared parser.

3. The method according to claim 1, the transforming further comprising transforming each of the plurality of data sources into a single, intermediate meta-data format common to each of the set of data sources.

4. The method according to claim 1, wherein the plurality of data sources includes multiple data source types.

5. The method according to claim 1, further comprising:
   monitoring a triplestore database type;
   determining a compatibility of the first shared parser with the triplestore database type; and
   indicating, in the case that the first shared parser is not compatible with the triblestore database, that the first shared parser is not compatible.

6. A system for triplestore database population comprising:
   at least one processing unit;
   memory operably associated with the at least one processing unit; and
   a triplestore management tool storable in memory and executable by the at least one processing unit, the triplestore management tool comprising:
      a formatting component configured to:
         receive a plurality of data sources parsed by a plurality of data source parsers, wherein each of the plurality of data sources corresponds to each of the plurality of data source parsers according to a data type of each of the plurality of data sources; and
         transform each of the plurality of parsed data sources into a single intermediary format, the intermediary format not associated with a database into which the data sources are to be stored; and
      a parsing component configured to:
         identify a triplestore database into which the data sources are to be stored;
         select a first shared parser based on compatibility with the triplestore database;
         replace the triplestore database with a second triplestore database;
         select a second shared parser to receive the intermediary format, the second shared parser being selected for compatibility with the second triplestore database; and
         replace the first shared parser with the second shared parser, wherein the second shared parser is configured to parse from the intermediary format to a format of the second triplestore database, and wherein the plurality of data source parsers are not replaced.

7. The system according to claim 6, the parsing component configured to parse each of the plurality of transformed data sources into Resource Description Framework (RDF) data at the first shared parser.

8. The system according to claim 6, the formatting component configured to transform each of the plurality of data sources into a single, intermediate meta-data format common to each of the plurality of data sources.

9. The system according to claim 6, the formatting component configured to receive a plurality of data source types associated with the plurality of data sources.

10. The system according to claim 6, the parsing component further configured to:
monitor a triplestore database type;
determine a compatibility of the first shared parser with the triplestore database type; and
indicate, in the case that the first shared parser is not compatible with the triblestore database, that the first shared parser is not compatible.

11. A computer usable tangible storage device storing computer instructions, which when executed, enables a computer system for triplestore database population, the computer instructions comprising:
receiving a plurality of data sources parsed by a plurality of data source parsers, wherein each of the plurality of data sources corresponds to each of the plurality of data source parsers according to a data type of each of the plurality of data sources;
transforming each of the plurality of parsed data sources into a single intermediary format, the intermediary format not associated with a database into which the data sources are to be stored;
identifying a triplestore database into which the data sources are to be stored;
selecting a first shared parser based on compatibility with the triplestore database;
replacing the triplestore database with a second triplestore database;
selecting a second shared parser to receive the intermediary format, the second shared parser being selected for compatibility with the second triplestore database; and
replacing the first shared parser with the second shared parser, wherein the second shared parser is configured to parse from the intermediary format to a format of the second triplestore database, and wherein the plurality of data source parsers are not replaced.

12. The computer usable tangible storage device according to claim 11 further comprising computer instructions for parsing each of the plurality of transformed data sources into Resource Description Framework (RDF) data at the first shared parser.

13. The computer usable tangible storage device according to claim 11 further comprising computer instructions for transforming each of the plurality of data sources into a single, intermediate meta-data format common to each of the plurality of data sources.

14. The computer usable tangible storage device according to claim 11 further comprising computer instructions for receiving a plurality of data source types associated with the plurality of data sources.

15. The computer usable tangible storage device according to claim 11 further comprising computer instructions for:
monitoring a triplestore database type;
determining a compatibility of the first shared parser with the triplestore database type; and
indicating, in the case that the first shared parser is not compatible with the triblestore database, that the first shared parser is not compatible.

* * * * *